U.S. PATENT DOCUMENTS

| | | | |
|---|---|---|---|
| 4,587,532 A | | 5/1986 | Asano |
| 4,698,629 A * | | 10/1987 | Mori et al. ................. 709/251 |
| 4,788,647 A * | | 11/1988 | McManus et al. ........... 700/287 |
| 4,826,148 A * | | 5/1989 | Coons, Jr. ................... 271/245 |
| 4,836,119 A | | 6/1989 | Siraco |
| 5,080,340 A | | 1/1992 | Hacknauer |
| 5,095,342 A | | 3/1992 | Farrell |
| 5,159,395 A | | 10/1992 | Farrell |
| 5,208,640 A | | 5/1993 | Horie |
| 5,272,511 A | | 12/1993 | Conrad |
| 5,305,447 A * | | 4/1994 | Hampshire ................. 711/112 |
| 5,326,093 A | | 7/1994 | Sollitt |
| 5,363,175 A * | | 11/1994 | Matysek ..................... 399/77 |
| 5,389,969 A | | 2/1995 | Suzuki |
| 5,435,544 A | | 7/1995 | Mandel |
| 5,448,735 A * | | 9/1995 | Anderson et al. ........... 718/100 |
| 5,473,419 A | | 12/1995 | Russel |
| 5,504,568 A | | 4/1996 | Saraswat |
| 5,525,031 A | | 6/1996 | Fox |
| 5,542,088 A * | | 7/1996 | Jennings et al. ............. 718/103 |
| 5,557,367 A | | 9/1996 | Yang |
| 5,568,246 A | | 10/1996 | Keller |
| 5,570,172 A | | 10/1996 | Acquaviva |
| 5,596,416 A | | 1/1997 | Barry |
| 5,629,762 A | | 5/1997 | Mahoney |
| 5,636,124 A * | | 6/1997 | Rischar et al. .............. 700/100 |
| 5,710,968 A | | 1/1998 | Clark |
| 5,727,135 A | | 3/1998 | Webb et al. |
| 5,778,377 A | | 7/1998 | Marlin |
| 5,838,596 A * | | 11/1998 | Shimomura et al. ............ 703/6 |
| 5,870,545 A * | | 2/1999 | Davis et al. ................. 709/201 |
| 5,884,910 A | | 3/1999 | Mandel |
| 5,991,669 A | | 11/1999 | Dominke et al. |
| 5,995,721 A | | 11/1999 | Rourke |
| 6,059,284 A | | 5/2000 | Wolf |
| 6,091,998 A | | 7/2000 | Vasko et al. |
| 6,094,604 A * | | 7/2000 | Bucher et al. ............... 700/129 |
| 6,125,248 A | | 9/2000 | Moser |
| 6,241,242 B1 | | 6/2001 | Munro |
| 6,260,148 B1 | | 7/2001 | Aggarwal et al. |
| 6,297,886 B1 | | 10/2001 | Cornell |
| 6,384,918 B1 | | 5/2002 | Hubble, III |
| 6,421,570 B1 | | 7/2002 | McLaughlin et al. |
| 6,424,900 B2 | | 7/2002 | Murray et al. |
| 6,450,711 B1 | | 9/2002 | Conrow |
| 6,476,376 B1 | | 11/2002 | Biegelsen |
| 6,476,923 B1 | | 11/2002 | Cornell |
| 6,493,098 B1 | | 12/2002 | Cornell |
| 6,496,755 B2 * | | 12/2002 | Wallach et al. .............. 700/245 |
| 6,496,848 B1 * | | 12/2002 | Nankaku .................... 718/100 |
| 6,537,910 B1 | | 3/2003 | Burke |
| 6,550,762 B2 | | 4/2003 | Stoll |
| 6,554,276 B2 | | 4/2003 | Jackson |
| 6,577,925 B1 * | | 6/2003 | Fromherz .................. 700/255 |
| 6,607,320 B2 | | 8/2003 | Bobrow |
| 6,608,978 B2 | | 8/2003 | Robertson et al. |
| 6,608,988 B2 | | 8/2003 | Conrow |
| 6,612,566 B2 | | 9/2003 | Stoll |
| 6,615,091 B1 | | 9/2003 | Birchenough et al. |
| 6,621,576 B2 | | 9/2003 | Tandon |
| 6,633,382 B2 | | 10/2003 | Hubble, III |
| 6,639,669 B2 | | 10/2003 | Hubble, III |
| 6,640,156 B1 * | | 10/2003 | Brooks et al. ............... 700/213 |
| 6,782,302 B1 * | | 8/2004 | Barto et al. ................. 700/101 |
| 6,813,523 B2 * | | 11/2004 | Mauro ........................... 700/9 |
| 6,819,906 B1 | | 11/2004 | Herrmann |
| 7,010,396 B2 * | | 3/2006 | Ware et al. ................. 700/284 |
| 7,146,232 B2 * | | 12/2006 | Staron et al. ................. 700/83 |
| 7,269,475 B1 * | | 9/2007 | Hogg et al. ................. 700/229 |
| 2001/0023377 A1 | | 9/2001 | Wehrung et al. |
| 2001/0029408 A1 | | 10/2001 | Murray et al. |
| 2001/0034557 A1 | | 10/2001 | Hudson et al. |
| 2002/0078012 A1 | | 6/2002 | Ryan |
| 2002/0103559 A1 | | 8/2002 | Gartstein |
| 2002/0138242 A1 | | 9/2002 | Wilensky et al. |
| 2002/0140959 A1 | | 10/2002 | Harper |
| 2002/0178292 A1 | | 11/2002 | Mushkin et al. |
| 2002/0194269 A1 | | 12/2002 | Owada et al. |
| 2003/0005180 A1 * | | 1/2003 | Schmit et al. ............... 709/328 |
| 2003/0041089 A1 * | | 2/2003 | Mauro ........................ 709/106 |
| 2003/0077095 A1 | | 4/2003 | Conrow |
| 2003/0229402 A1 * | | 12/2003 | Junger et al. .................... 700/2 |
| 2004/0085561 A1 | | 5/2004 | Fromherz |
| 2004/0085562 A1 | | 5/2004 | Fromherz |
| 2004/0088207 A1 | | 5/2004 | Fromherz |
| 2004/0111339 A1 | | 6/2004 | Wehrung et al. |
| 2004/0150156 A1 | | 8/2004 | Fromherz |
| 2004/0150158 A1 | | 8/2004 | Biegelsen |
| 2004/0153983 A1 | | 8/2004 | McMillan |
| 2004/0216002 A1 | | 10/2004 | Fromherz |
| 2004/0225391 A1 | | 11/2004 | Fromherz |
| 2004/0225394 A1 | | 11/2004 | Fromherz |
| 2004/0236443 A1 * | | 11/2004 | Ware et al. ................... 700/90 |
| 2004/0236691 A1 * | | 11/2004 | Force et al. ................... 705/43 |
| 2004/0250168 A1 | | 12/2004 | Tichy et al. |
| 2005/0122339 A1 * | | 6/2005 | Andrews et al. ............ 345/557 |
| 2006/0033771 A1 * | | 2/2006 | Lofthus ....................... 347/40 |
| 2006/0069599 A1 | | 3/2006 | Hatoun et al. |
| 2006/0095672 A1 * | | 5/2006 | Andrews et al. ............ 711/118 |
| 2006/0155392 A1 * | | 7/2006 | Fay et al. ..................... 700/18 |
| 2006/0195842 A1 * | | 8/2006 | Williams .................... 718/100 |
| 2006/0221362 A1 * | | 10/2006 | Julien ......................... 358/1.4 |
| 2006/0277053 A1 | | 12/2006 | Lobb et al. |

OTHER PUBLICATIONS

U.S. Appl. No. 10/357,761, filed Feb. 4, 2003, Fromherz, et al.
Mauve, "Consistency in Continuous Distributed Interactive Media," Reihe Informatik, 1999, pp. 1-11.
Website at http://www.cis.upenn.edu/~kumar/wcc/, Block Island Workshop on Cooperative Control, 2003, 1 page.
Website at http:/meetingmattersplus.net/CCO3.html, Conference on Cooperative Control and Optimization, 2003, 2 pages.
Website at http://www.ise.ufl.edu/cao/cco/, 4$^{th}$ International Conference on Cooperative Control and Optimization, 2002, 1 page.
Website at http://www.ise.ufl.edu/cao/cco2001, Conference on Cooperative Control and Optimization, 2001, 1 page.
Website at http://www.seas.ucla.edu/coopcontrol/, Cooperative Control of Distributed Autonomous Vehicles in Adversarial Environments AFOSR cooperative control MURI, 2 pages.
U.S. Appl. No. 10/740,705, filed Dec. 19, 2003, Biegelsen, et al.
U.S. Appl. No. 10/761,522, filed Jan. 21, 2004, Mandel, et al.
U.S. Appl. No. 10/785,211, filed Feb. 24, 2004, Lofthus, et al.
U.S. Appl. No. 10/812,376, filed Mar. 29, 2004, Duff, et al.
U.S. Appl. No. 10/860,195, filed Jun. 6, 2004, Lofthus, et al.
U.S. Appl. No. 10/881,619, filed Jun. 30, 2004, Bobrow.
U.S. Appl. No. 10/917,768, filed Aug. 13, 2004, Lofthus.
U.S. Appl. No. 10/924,106, filed Aug. 23, 2004, Lofthus.
U.S. Appl. No. 10/924,113, filed Aug. 23, 2004, deJong, et al.
U.S. Appl. No. 10/924,459, filed Aug. 23, 2004, Mandel, et al.
R. Luck and A. Ray, "An Observer-based Compensator for Distributed Delays," *Automatica*, vol. 26, No. 5, pp. 903-908, 1990.
J.-J. E. Slotine and W. Wang, "A Study of Synchronization and Group Cooperation Using Partial Contraction Theory," in *Cooperative Control: A Post-Workshop vol. 2003 Block Island Workshop on Cooperative Control*, V. Kumar, N. Leonard, and A. S. Morse, eds., Springer, 2005.
L. A. Montestruque and P. J. Antsaklis, "Networked Control Systems: A Model-Based Approach," in Proceedings of the *12th IEEE Mediterranean Conference on Control and Automation*, Kusadasi, Turkey, Jun. 6-9, 2004.
F. Borrelli, T. Keviczky, G. J. Balas, G. Stewart, K. Fregene, and D. Godbole, "Hybrid Decentralized Control of Large Scale Systems," in

*Hybrid Systems: Computation and Control: 8th International Workshop*, (HSCC 2005), M. Morari and L. Thiele, eds., Zurich, Switzerland, Mar. 9-11, 2005.

Fromherz, et al., "Coordinated Control for Highly Reconfigurable Systems," published at HSCC 2005, Zurich, Switzerland, copyright Springer-Verlag.

Website at http://www.springerlink.com/app/home/contribution.asp, Accelerating the World of Search, 2005, pp. 1 & 2.

Hindi, et al., "Synchronization of State Based Control Processes with Delayed and Asynchronous Measurements," unpublished paper submitted to 44$^{th}$ IEEE Conference on Decision and Control and European Control Conference ECC 2005.

Website at http://www.esi2.us.es/~cdcecc05, 44$^{th}$ IEEE Conference on Decision and Control and European Control Conference ECC 2005, pp. 1-3.

Morgan, P.F., "Integration of Black Only and Color Printers", Xerox Disclosure Journal, vol. 16, No. 6, Nov./Dec. 1991, pp. 381-383.

Desmond Fretz, "Cluster Printing Solution Announced", Today at Xerox (TAX), No. 1129, Aug. 3, 2001.

U.S. Appl. No. 10/924,458, filed Aug. 23, 2004, Lofthus et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/001,890, filed Dec. 2, 2004, Lofthus et al.
U.S. Appl. No. 11/002,528, filed Dec. 2, 2004, Lofthus et al.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthus, et al.

* cited by examiner

DISTRIBUTED CONTROL SYSTEMS AND METHODS THAT SELECTIVELY ACTIVATE RESPECTIVE COORDINATORS FOR RESPECTIVE TASKS

CROSS REFERENCE

The following applications, the disclosures of each being totally incorporated herein by reference are mentioned: U.S. patent application Ser. No. 11/102,355, filed Apr. 8, 2005, for Communication in a Distributed System by Markus P. J. Fromherz, et al.; U.S. patent application Ser. No. 11/102,899, filed Apr. 8, 2005, for Synchronization in a Distributed System by Lara S. Crawford, et al.; and U.S. patent application Ser. No. 11/102,332, filed Apr. 8, 2005, for On-The-Fly State Synchronization in a Distributed System by Haitham A. Hindi, et al.

BACKGROUND

There is illustrated herein in embodiments, an architecture including methods and systems for coordinating activities in a distributed system. For example, a distributed system may include a collection of modules, each with its own function. The collection of modules is interconnected to carry out a particular function or functions. The interconnection may be physical and/or logical in nature. Modules may be connected by a network or other communications scheme. Communications media may include wire, coaxial cable, fiber optics and/or radio frequency (RF) transmissions. Embodiments will be described with reference to document processing systems. However, embodiments of the architecture may be beneficially applied in a wide variety of control system environments.

Document processors include, for example, printers, copiers, facsimile machines, finishers and devices for creating documents, such as word processors and desk top publishers. In some instances, document processors provide the services of two or more of these devices. For instance, document processors that provide printing, copying, scanning, and faxing services are available. Printers and copiers can include finishers that staple, shrink wrap or otherwise bind system output. Finishers may also fold or collate documents.

In order to increase throughput, some printers and copiers are being developed which include two or more marking engines. For example, U.S. patent application Ser. No. 10/924,113 filed Aug. 23, 2004 by Jonas M. M. deJong, et al. for a Printing System with Inverter Disposed for Media Velocity Buffering and Registration, which issued on Oct. 17, 2006 as U.S. Pat. No. 7,123,873; U.S. patent application Ser. No. 10/924,106 filed Aug. 23, 2004 by Robert M. Lofthus, et al. for a Printing System with Horizontal Highway and Single Pass Duplex, which issued on Apr. 4, 2006 as U.S. Pat. No. 7,024,152; U.S. patent application Ser. No. 10/924,459 filed Aug. 23, 2004 by Barry P. Mandel, et al. for a Parallel Printing Architecture Consisting of Containerized Image Marking Engine Modules, which issued on Nov. 14, 2006 as U.S. Pat. No. 7,136,616; U.S. patent application Ser. No. 10/860,195 filed Jun. 6, 2004 by Robert M. Lofthus, et al. for a Universal Flexible Plural Printer to Plural Finisher Sheet Integration System, which issued on Jan. 22, 2008 as U.S. Pat. No. 7,320,461; U.S. patent application Ser. No. 10/881,619 filed Jun. 30, 2004 by Daniel G. Bobrow for a Flexible Paper Path Using Multidirectional Path Modules, which issued Jul. 8, 2008 as U.S. Pat. No. 7,396,012; U.S. patent application Ser. No. 10/761,522 filed Jan. 21, 2004 by Barry P. Mandel, et al. for a High Print Rate Merging and Finishing System for Parallel Printing, which issued on Dec. 6, 2005 as U.S. Pat. No. 6,973,286; U.S. patent application Ser. No. 10/785,211 filed Feb. 24, 2004 by Robert M. Lofthus, et al. for a Universal Flexible Plural Printer to Plural Finisher Sheet Integration System, which issued on Jun. 5, 2007 as U.S. Pat. No. 7,226,049; and U.S. patent application Ser. No. 10/917,768 filed Aug. 13, 2004 by Robert M. Lofthus for a Parallel Printing Architecture Consisting of Containerized Image Marking Engines and Media Feeder Modules, which issued on Mar. 13, 2007 as U.S. Pat. No. 7,188,929, all of which are incorporated herein by reference, describe aspects of tightly integrated document processing systems including a plurality of marking engines.

Additionally, some printers and copiers are being developed using a hypermodular structure to increase modularity and flexibility. These systems may possess a number of distributed processors, sensors, and actuators. For example, U.S. patent application Ser. No. 10/357,687 filed Feb. 4, 2003 by David K. Biegelsen, et al., for Media Path Modules, which issued on Aug. 22, 2006 as U.S. Pat. No. 7,093,831; U.S. patent application Ser. No. 10/357,761 filed Feb. 4, 2003 by Markus P. J. Fromherz, et al., for Frameless Media Path Modules; U.S. patent application Ser. No. 10/740,705 filed Dec. 19, 2003 by David K. Biegelsen, et al., for a Flexible Director Paper Path Module, which issued Sep. 19, 2006 as U.S. Pat. No. 7,108,260; and U.S. patent application Ser. No. 10/812,376 filed Mar. 29, 2004 by David G. Duff, et al., for a Rotational Jam Clearance Apparatus, which issued Mar. 6, 2007 as U.S. Pat. No. 7,185,888, all of which are incorporated herein by reference, describe aspects of tightly integrated document processing systems including hypermodules.

Some systems, including some document processing systems, are based on a centralized control architecture wherein a single computational platform controls all system actuators and receives all system feedback information. These architectures work well where the systems are relatively small and are of a fixed or unchanging configuration. However, as system size increases, the computational capabilities of a single platform can be overwhelmed. Additionally, providing individual interfaces between the single computational platform and each of the sensors and actuators of the system can be impractical. Furthermore, where it is desirable to assemble or reconfigure a system from various subcomponents, the direct interfacing of sensors and actuators to the central platform becomes problematic.

These factors have led to the development of systems based on network communications. For example, U.S. Pat. No. 6,615,091 B1 to Birchenough, et al. for a Control System and Method Therefore allegedly disclosed an embodiment of a distributed control system including a main control coordinator, three local process station controllers and a designated number of process module controllers, each associated with a process module. The control system allegedly provides a real time operating system and has a communication bus platform provided via an Ethernet™ communication bus and a second bus to connect the controllers in a distributed control network. The Ethernet™ bus connects the main control coordinator and each of the local process station controllers and a continuous motion conveyer controller. Each of the process module controllers are connected via the second bus to designated local process station controllers.

In the system of Birchenough, the main controller agent interacts with each of the process station agents, and each of the process station agents interacts with each of the process module agents that are assigned thereto. During normal manufacturing operation, the main controller coordinator agent sends article notice messages to the process station agents to notify the process station agents of the oncoming articles of manufacture. A process station normally will not process the article of manufacture unless the process station agent that controls a particular process module has received an article notice message indicating that it should do so and the continuous feed indexer has returned a report that it is in proper position. In response, the process station agent notifies the designated process module agent to initiate its programmed process operation. Once the process module has completed its intended operation, the process module agent issues a work report message which is sent to the process station agent. The process station agent then broadcasts the work report message to other process stations as well as to the main control coordinator.

It appears that in the system of Birchenough, et al., a single entity (e.g., the main coordinator) is aware of and maintains information regarding each task, object or workpiece being processed by the system. This may limit the scalability of the system. For example, as the size of the system increases, the capabilities and/or resources of the main control coordinator (or processor running the main control coordinator) may be overwhelmed.

Accordingly, there has been a desire for a distributed control architecture, including systems and methods, that provides for scalability and reconfigurability in a modular system environment.

BRIEF DESCRIPTION

A method for coordinating controllers in a distributed control system that is operative to perform a plurality of simultaneous tasks includes determining a respective task of the plurality to be performed and activating a respective coordinator in association with the respective task. The respective coordinator may then identify a plurality of respective subtasks to be performed in order to complete the respective task, identify a plurality of respective controllers for controlling a plurality of actuators to perform the respective subtasks, generate respective commands for directing the performance of the respective plurality of subtasks and communicate the respective commands to the respective controllers as appropriate to the respective subtasks. The respective coordinator may also identify at least one respective information source that is able to provide progress information regarding the performance of the respective subtasks, collect the respective progress information from the respective at least one information source and communicate the respective progress information to the respective controllers as appropriate to the respective subtasks.

The method may also include deactivating respective controllers as respective subtasks are determined to be completed based on the collected respective progress information, thereby releasing the respective controllers to execute commands communicated from another coordinator associated with another task and/or deactivating the coordinator when the respective task is determined to be completed. For example, one or more model may be maintained to estimate progress of the respective subtasks and the coordinator and/or controllers may be deactivated when the respective subtasks are completed according to the one or more models.

For instance the models can be based on commands the coordinator generates and/or on progress information received from progress information sources. The output of command based models and progress information models can be compared to determine a task progress error value. The error value can be compared to an error limit. An error task, such as generating an error message or taking corrective or compensatory action, can be performed if the error value is beyond the error limit.

Some embodiments include a method for coordinating controllers in a distributed control system that is operative to simultaneously perform operations on a plurality of workpieces. These embodiments can include activating a respective coordinator for each respective workpiece, wherein each respective coordinator encompasses knowledge regarding an itinerary of operations to be applied to each respective workpiece. Each respective coordinator may then issue respective commands to a series of actuator controllers for directing a series of actuators to perform respective operations on the respective workpiece according to the itinerary, maintain at least one respective estimate of progress of the respective operations performed on the respective workpiece and deactivate the respective coordinator when the itinerary of operations is completed.

A method for processing a sheet in a document processing system can include receiving a sheet description specifying a document processing job to be performed on the sheet and activating a coordinator as a proxy for the sheet. The coordinator may then identify a plurality of respective subtasks to be performed in order to process the sheet according to the sheet description, identify, based on the identified respective subtasks, a plurality of respective controllers for controlling a plurality of actuators to perform the respective subtasks, generate respective commands for directing the respective plurality of subtasks and communicate the respective commands to the respective controllers as appropriate to the respective subtasks. The coordinator may also identify at least one respective information source that is able to provide progress information regarding the performance of the respective subtasks, collect the respective progress information from the respective at least one information source, communicate the respective progress information to the respective controllers as appropriate to the respective subtasks, estimate the respective progress of the respective subtasks and deactivate the respective controllers as the subtasks are completed. The coordinator may be deactivated when the task is completed.

A system that is operative to perform embodiments of the methods can include a plurality of controllers, at least one supervisor element, and a plurality of information sources. The at least one supervisory element may be operative (alone or in combination) to generate respective task descriptions describing respective tasks, to activate respective coordinators to be responsible for orchestrating completion of the respective tasks and to communicate the respective task descriptions to the respective coordinators. The plurality of controllers may be operative to control a plurality of actuators according to respective subtask descriptions received from the respective coordinators. The plurality of information sources may be operative to report status information regarding respective progress of respective tasks to the respective coordinators. For example, the information sources may be sensors of the system or models or estimators of the controllers. The respective coordinators may be operative to receive the respective task descriptions, identify, based on the respective task descriptions, a plurality of respective subtasks to be performed in order to complete the task, identify, based on the respective subtasks, a subset of the plurality of respective controllers, for controlling a subset of the plurality of actuators to perform the respective subtasks, identify respective subsets of the plurality of information sources that are able to provide progress information regarding the performance of the respective subtasks, generate respective commands for performing the respective plurality of subtasks, communicate the respective commands to the respective controllers as appropriate to the respective subtasks, collect the respective progress information from the respective subsets of information sources and communicate the respective progress information to the respective controllers as appropriate to the respective subtasks.

A document processing system embodiment can include one or more marking engines, including, for example a xerographic marking engine. Additionally, the system can include a transportation system that is operative to transport sheets of print media to and/or from the first marking engine. Some embodiments may also include a plurality of information sources that are operative to report status information regarding respective progress of respective sheet processing tasks to the respective sheet coordinators. The transportation system can include a plurality of transport actuators, at least one supervisory element, a plurality of respective transport controllers and a module controller. The at least one supervisory element can be operative (alone or in combination) to generate respective sheet processing task descriptions describing respective sheet processing tasks and to activate respective sheet coordinators to be responsible for orchestrating the respective sheet processing tasks according to the respective sheet processing task descriptions. The plurality of respective transport controllers can be operative to control respective sets of transport actuators, of the plurality of transport actuators, according to respective sheet processing subtask descriptions received from the respective sheet coordinators. The first marking module controller may be operative to control aspects of processing of a first marking engine according to respective sheet processing subtask descriptions received from the respective sheet coordinators.

For example, the respective sheet coordinators are operative to receive the respective sheet processing task descriptions, identify, based on the respective sheet processing task descriptions, a plurality of respective sheet processing subtasks to be performed in order to complete the respective sheet processing tasks, identify, based on the respective sheet processing subtasks, a subset of the plurality of respective transport controllers and the first marking module controller, for controlling a subset of the plurality of transport actuators and the first marking engine to perform the respective sheet processing subtasks, identify respective subsets of the plurality of information sources that are able to provide progress information regarding the performance of the respective sheet processing subtasks, generate respective commands for performing the respective plurality of sheet processing subtasks, communicate the respective commands to the respective transport controllers and/or first marking engine controller as appropriate to the respective subtasks, collect the respective progress information from the respective subsets of information sources and communicate the respective progress information to the respective transportation controllers and/or first marking engine controller as appropriate to the respective sheet processing subtasks.

DETAILED DESCRIPTION

Figure 1:
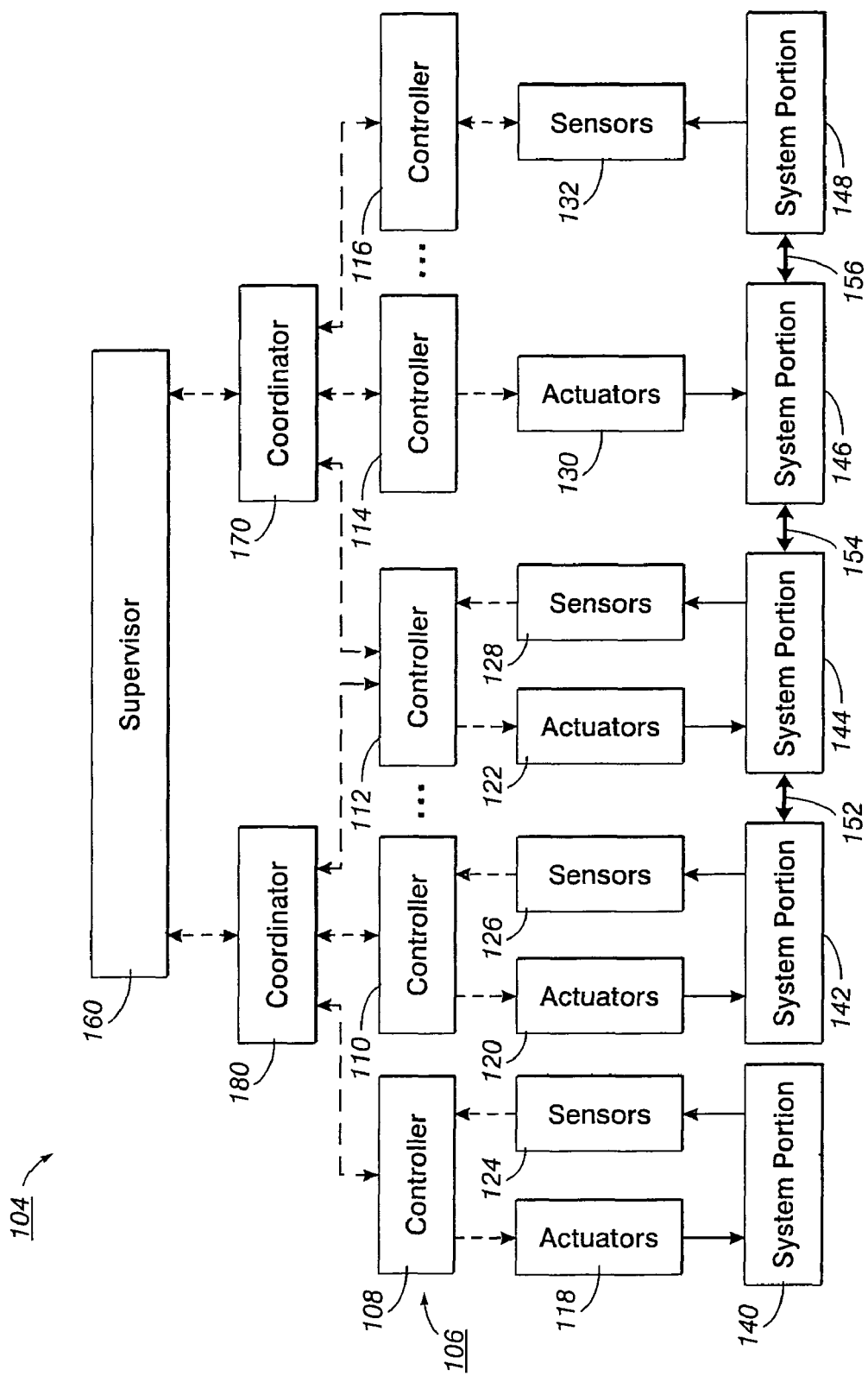
FIG. 1 is a block diagram of a system wherein a supervisory element has activated, spawned or instantiated a plurality of respective coordinators that are responsible for orchestrating respective tasks.

Referring to FIG. 1, a first system 104 embodiment includes a plurality 106 of controllers. For example, the plurality 106 of controllers includes a first, second, third, fourth and fifth controller 108, 110, 112, 114, 116. The controllers may, for example, be associated with actuators and sensors. For instance, the first, second and third controllers 108, 110, 112 are associated with first, second and third sets of actuators 118, 120, 122 and first, second and third sets of sensors 124, 126, 128. The fourth controller 114 is associated with a fourth set of actuators 130. The fifth controller 116 is associated with a fourth set of sensors 132. The actuators 118, 120, 122, 130 and sensors 124, 126, 128, 132 manipulate or sense objects in, or aspects of, respective portions of the system 104. For example, the first set of actuators 118 and first set of sensors 124 are associated with a first portion 140 of the system 104. The second set of actuators 120 and the second set of sensors 126 are associated with a second portion 142 of the system 104. The third set of actuators 122 and the third set of sensors 128 are associated with a third portion 144 of the system 104. The fourth set of actuators 130 are associated with a fourth portion 146 of the system 104 and the fourth set of sensors 132 are associated with a fifth portion 148 of the system 104.

Some or all of the system portions may be tightly coupled. Tightly coupled systems or system portions are those wherein the performance or activities of a first system portion has an effect on the performance or activities of a second portion, even to the point where, if the activities of the first portion and the second portion are not coordinated, they may interfere with or disrupt each other. For instance, in an automotive system, an engine/transmission subsystem may be considered to be tightly coupled with a braking subsystem because an uncoordinated application of the braking system may interfere with or prevent the engine/transmission system from propelling a vehicle.

In the embodiment illustrated in FIG. 1, first, second and third elements of system dynamics 152, 154, 156 tightly couple the second system portion 142 to the third system portion 144, tightly couple the third system portion 144 to the fourth system portion 146 and tightly couple the fourth system portion 146 to the fifth system portion 148. The first system portion 140 is illustrated as having only a loose or minimal interaction with the second system portion 142 and is not tightly coupled thereto.

The first system 104 may also include a supervisor 160 or supervisory element. For example, the supervisory element 160 may be a scheduler and/or a planner. The supervisor 160 determines which tasks are to be performed or which workpieces are to be processed. This element and/or one or more other supervisory elements activate, spawn or instantiate a separate coordinator for each task or workpiece. For example, a first coordinator 170 is activated or spawned in association with a first task or workpiece, and a second coordinator 180 is activated or spawned in association with a second task or workpiece. The coordinators 170, 180 are activated and initialized in such a manner as to prevent interference between the coordinators.

For example, if the first task or workpiece and the second task or workpiece both require the services of the first, second, third, fourth and fifth system portions 140, 142, 144, 146,

148, then, for example, the first coordinator 170 is activated and takes control of the first system portion 140 by communicating with the first controller 108. The activation of the second coordinator 180 may be delayed until the first coordinator 170 no longer requires the services of the first system portion 140. Alternatively, the second coordinator 180 is activated early and directed to wait or idle until such a time as the first coordinator 170 no longer needs the services of a first system resource (e.g., 140).

The first coordinator 170 releases the first controller 108 when the first task or workpiece no longer needs the services of the first system portion 140. The first coordinator 170 may then send commands requesting the services of another system resource (e.g., the second system portion 142) for accomplishing a second subtask. Alternatively, the first coordinator 170 may begin requesting services from the second resource before the first resource has completed a first subtask. In either case, the first coordinator 170 sequentially sends commands to the controllers (e.g., 110, 112, 114, 116) requesting services of their respective system portions (e.g., 142, 144, 146, 148). When appropriate, the first coordinator 170 sends coordinated commands to a plurality of controllers. For example, if a subtask requires coordinated activity between two or more system portions at once, then the coordinator generates coordinated commands to two or more controllers associated therewith.

In FIG. 1, the first system 104 embodiment is depicted at a point in time wherein the first task or workpiece requires the services of the fourth system portion 146 and the first coordinator is communicating with the fourth controller 114. Proximate to issuing commands to, or taking control of, the fourth controller 114, the third controller 112 may have been deactivated or released from the control of the first coordinator 170. For example, commands previously issued to the third controller 112 might have been associated with an expiration parameter. The expiration parameter may have been, for example, a time limit or a processing milestone. When an event occurs that matches or surpasses the value of the expiration parameter, the third controller 112 may be deactivated or released from the control of the first coordinator 170.

Alternatively, the first workpiece or task may require simultaneous services of both the third system portion 144 and the fourth system portion 146. In that case, the first coordinator generates and communicates coordinated or cooperative commands to the third 112 and fourth 114 controllers.

At an appropriate point, the first coordinator will generate commands and transmit or communicate them to the fifth controller 116 requesting services of the fifth system portion 148. If the services of the fifth system portion are required contemporaneously with the services of fourth 146 and/or third 144 system portions, then the first coordinator 170 generates and communicates cooperative commands to the fifth 116, fourth 114 and/or third 112 controllers.

FIG. 1 also illustrates the second coordinator 180 to be in communication with the second controller 110. For example, the second coordinator 180 is requesting services of the second system portion 142. The first controller 108 is being, or has been, released from serving the second coordinator 180, and the second coordinator 180 is preparing or will prepare to take control, or request the services of, the third system portion 144 through the third controller 112. Since the second 142 and third system portions are tightly coupled 152, the second controller may generate and communicate cooperative commands to the second 110 and third 112 controllers, thereby directing them to perform cooperative operations or processes on the second task or workpiece. In some instances, the first coordinator 170 and the second coordinator 180 may communicate with each other to facilitate coordination or for other reasons.

When the first controller 108 is released or deactivated, it becomes available to execute commands of yet another coordinator (not shown) which the supervisor 160 may activate, spawn or instantiate to coordinate and orchestrate a third task or workpiece for processing.

Figure 2:
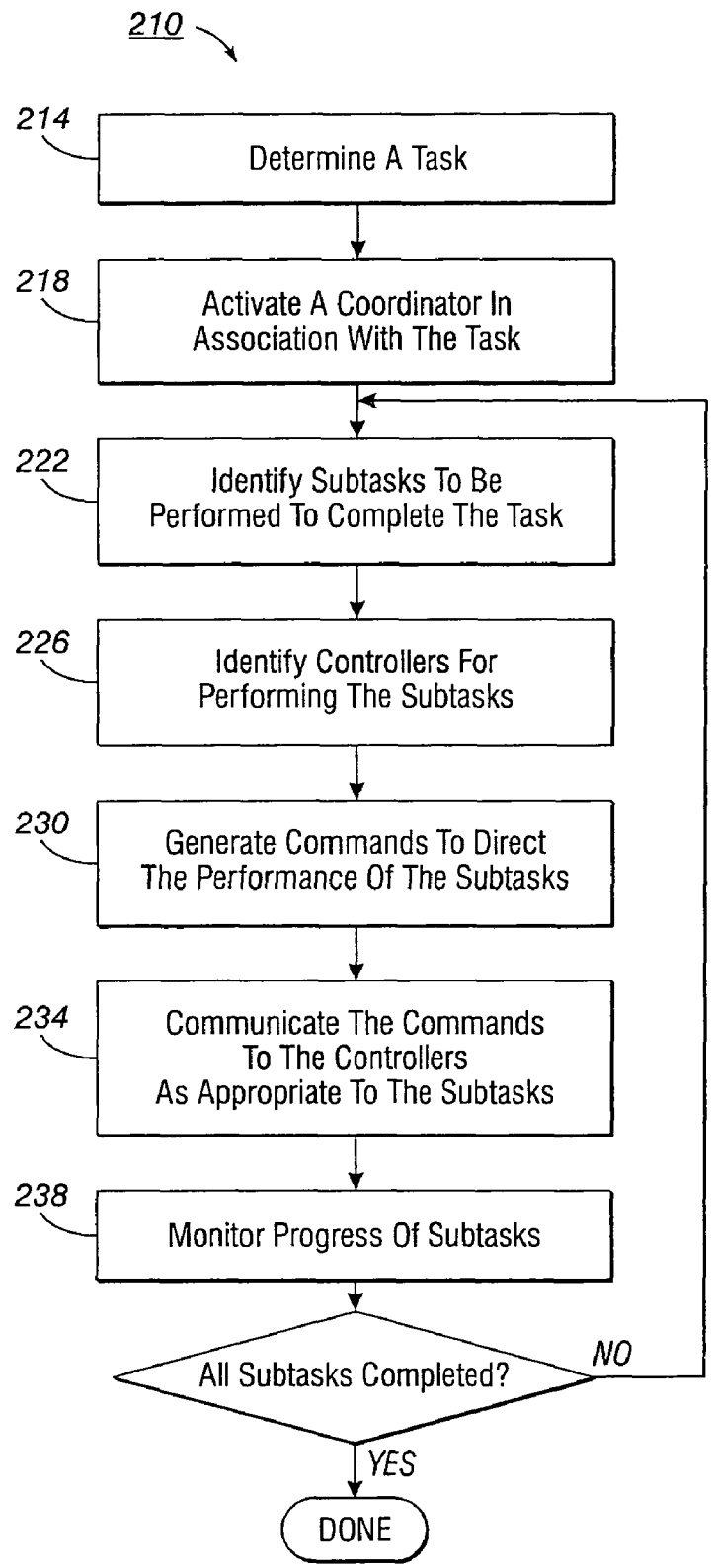
FIG. 2 is a flow chart outlining a method for coordinating controllers.

Referring to FIG. 2, a first method 210 for coordinating controllers in a distributed control system can include determining 214 a task to be performed by the system and activating 218 a coordinator (e.g., 170, 180) in association with the task. The coordinator (e.g., 170, 180) may then identify 222 subtasks to be performed in order to complete the task, identify 226 controllers for performing the subtasks, generate 230 commands to direct the controllers to perform the subtasks and communicate 234 the commands to the controllers as appropriate to the subtasks. The coordinator (e.g., 170, 180) may also monitor 238 the progress of the subtasks.

Determining 214 may be done by any known task determination method. For example, a supervisory element (e.g., 160) may autonomously determine that a task should be performed. For instance, sensor readings may indicate that a particular action is required. Alternatively, the supervisory element may receive instructions from another device or higher level supervisory device. For example, a system user may enter commands, through a user interface, directing that a task or series of tasks be performed. Alternatively, commands may be received over a network or via a wireless link from another system or remote user. The supervisory element may translate or transform such commands into a task description or specification and activate 218 a coordinator in accord with the task specification.

Activating 218 a coordinator in association with the task may include initializing a coordinator according to the task specification. For instance, a coordinator (e.g., 170, 180) may be embodied in software run by a computational platform such as a microprocessor. One or more coordinators may be loaded into program memory in an idle state. The supervisory element selects an idle coordinator and initializes it in accord with the task specification, thereby activating the coordinator. Alternatively, activating 218 a coordinator may include spawning or instantiating a coordinator by creating or loading a new process or by referencing a program or subprogram. The spawned or instantiated element may be initialized or loaded with the task specification or may simply be selected for spawning or instantiation based on the task specification. In a further alternative, the task specification may be transmitted or otherwise communicated to the coordinator at some point after the coordinator has been activated 218.

Identifying 222 subtasks to be performed to complete the task and identifying 226 controllers to perform the subtasks are related to each other and may occur simultaneously or contemporaneously. For example, identifying subtasks may be dependent on the capabilities of the controllers (e.g., 108, 110, 112, 114, 116) and modules or system portions (e.g., 140, 142, 144, 146, 148) associated with the controllers. For instance, if the task specification indicates that a hole is to be drilled in a workpiece, the coordinator (e.g., 170, 180) may have to determine how one system portion (e.g., 140, 142, 144, 146, 148) manipulating the piece will have to adjust its control to compensate for the forces applied by another system portion doing the drilling.

In some embodiments, it is assumed that all task specifications are valid. For example, a task specification requiring that a hole be placed in a workpiece would only be communicated to a coordinator if the system included a system portion capable of providing the hole. In other embodiments, the coordinator (e.g., 170, 180) checks the validity or feasibility of a task specification and communicates an error or exception message to the requesting entity (e.g., 160) if the specified task is not feasible or valid. In still other embodiments, validity or feasibility is determined by the controllers (e.g., 108, 110, 112, 114, 116) and communicated to the coordinators (e.g., 170, 180), and from the coordinators to the supervisor (e.g., 160).

Identifying 226 the controllers or system elements to be used to complete the task helps identify 222 the subtasks to be performed. For instance, subtasks for the hole-stamping example task mentioned above might include operating a motor in a transport system so as to move the workpiece to a hole-stamping module, operating a set of registration motors to align the workpiece in the hole-stamping module according to a desired hole location defined in the task specification, installing a stamp appropriate for stamping a hole of a size defined in the task specification in a chuck, operating actuators so as to stamp the hole in the workpiece, operating clamps and alignment motors to hold the workpiece in place in while the hole is being stamped, and operating motors in a transport system to move the workpiece out of the stamping module. Several of these subtasks would have to be coordinated; for example, the registration operation must be coordinated with the clamping and stamping operations.

System configuration and/or capabilities information is made available to the coordinator (e.g., 170, 180). For example, the coordinator may be initialized, spawned or instantiated with all the required system configuration information. Alternatively, the coordinator may have access to a database or may be able to query or poll all the available controllers in a system to determine their capabilities and, if appropriate, their relative locations.

Generating 230 commands to direct the performance of the subtasks is also system or embodiment dependent. In the hole stamping example from above, the activated 218 coordinator may generate 230 a command to direct a first controller (e.g., 108) to drive a workpiece ejection mechanism to eject one workpiece onto a transport mechanism. Another generated command may be for a second controller (e.g., 110), directing the second controller to drive the transport mechanism at a particular speed for a particular period of time or until a sensor indicates the workpiece has arrived at a particular position. Additional commands would be generated 230 to load and orient the workpiece in the hole punch module and to select, install and drive the punch as well as transport the finished workpiece to an output device.

Communicating 234 the commands to the controllers as appropriate to the subtasks can include any desired communication mechanism. For example, the activated 218 coordinator (e.g., 170, 180) may communicate with the controllers (e.g., 108, 110, 112, 114, 116) over a system network, such as Ethernet™ or the Controller Area Network (CAN) developed by Robert Bosch GmbH. Information regarding the format or protocol used to communicate with each controller (e.g., 108, 110, 112, 114, 116) is made available to the activated 218 coordinator, either during initialization or from some system resource such as a memory or database.

As indicated above, the activated 218 coordinator (e.g., 170, 180) may optionally monitor the progress of subtasks. For example, the controller may receive subtask completion messages from the controllers as each subtask is completed. Additionally, or alternatively, the activated 218 coordinator may establish and maintain a model of each subtask (or the task as a whole). For instance, where a communicated 234 command directs a controller to drive an actuator to move a workpiece at a given speed, the activated 218 coordinator may maintain a command model that estimates a position of the workpiece based on the commanded speed. The model assumes that the command will be followed. Additionally, or alternatively, the activated 218 coordinator may receive progress information from one or more progress information sources. For instance, the activated 218 coordinator (e.g., 170, 180) may receive progress information from a controller (e.g., 108, 110, 112, 114, 116) and/or from sensors (e.g., 124, 126, 128, 132). The activated 218 coordinator may maintain a progress model of the subtasks (or task as a whole) based on this progress information or may use the progress information to fine tune or update a command-based model.

Additionally, or alternatively, progress information and/or progress model information may be compared to output from the command model. If the progress information or progress model information is very different from progress estimates of the command model (i.e., the difference is beyond an error threshold), the activated 218 coordinator (e.g., 170, 180) may perform some error or exception handling task. For instance, a coordinator may send an error message or warning to a supervisory element (e.g., 160). Additionally, or alternatively, the activated 218 coordinator may generate 230 and communicate 234 commands to compensate for or correct the source of the error. For example, if the progress information indicates that processing in a first module or system portion is occurring slower than anticipated or directed by the commands, updated commands may be sent to a second module or system portion indicating a delayed start time for processing at that module or system portion. Alternatively, commands may be generated 230 and communicated 234 to the first module or system portion directing it to process a task or workpiece at a faster rate.

Figure 3:
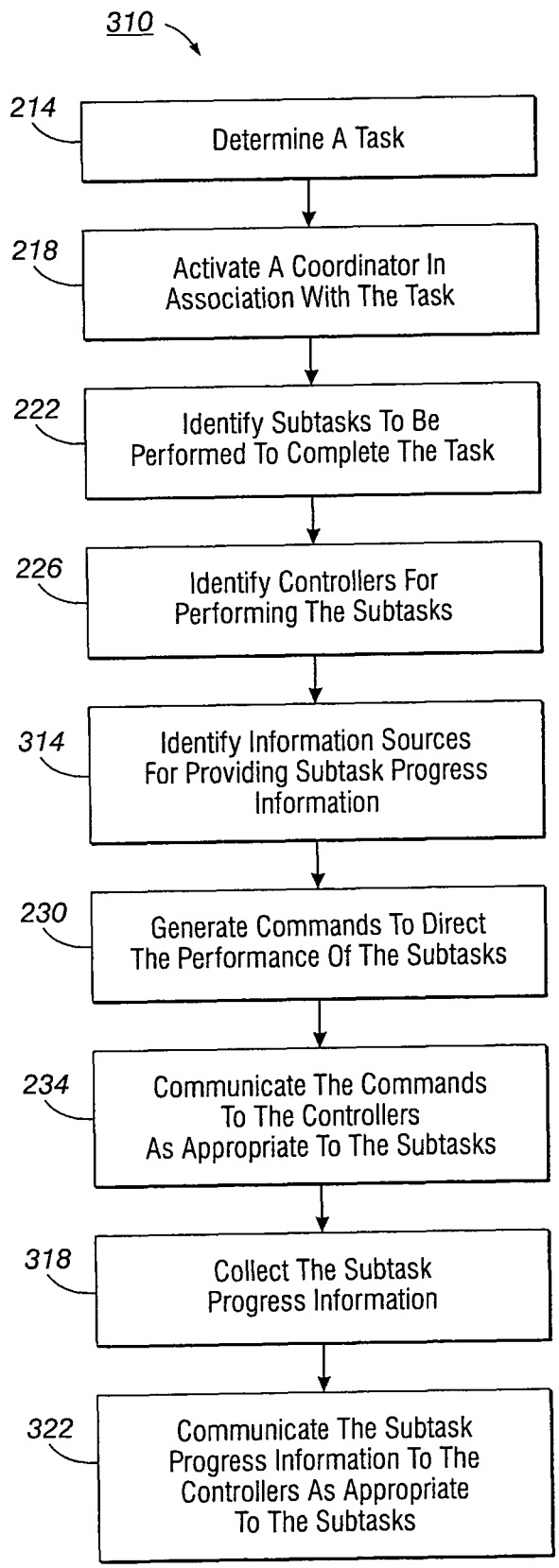
FIG. 3 is a flow chart outlining a method for coordinating controllers that includes collection and relaying of information.

The activated 218 coordinator may also act as a clearinghouse for progress information. Such a service may serve to conserve communication bandwidth in some systems. For example, referring to FIG. 3, a second embodiment or method 310 for coordinating controllers in a distributed control system includes determining 214 a task, activating 218 a coordinator, identifying 222 subtasks, identifying 226 controllers, generating 230 commands and communicating 234 the commands to the controllers as described above. Additionally, the second method 310 includes identifying 314 information sources for providing subtask progress information, collecting 318 the subtask progress information from the information sources and communicating 322 the subtask progress information to the controllers as appropriate to the subtasks.

Identifying 314 information sources proceeds in a manner similar to identifying 226 controllers for performing the subtask. System configuration and capabilities information is received from a memory or database or is provided at activation 218 time. The location and capabilities of available sensors (e.g., 124, 126, 128, 132) and controllers (e.g., 108, 110, 112, 114, 116) are evaluated in light of the identified 126 subtasks. If information from a controller or sensor that is not immediately available to an active controller (e.g., 114, 110) would be of benefit to the active controller in completing a subtask, that information source is identified 314. For example, information from the third set of sensors 128 may indicate that a workpiece is about to become available to the fourth system portion 146. Therefore, the coordinator 170 may request that information from one or more of the third set of sensors 128 be delivered to the first coordinator 170. The first coordinator may then relay 322 the delivered information to the fourth controller 114.

Collecting 318 the subtask progress information may include receiving the information from information sources after requesting or subscribing to the information from the identified 314 information sources. Again, the information may be received from a network or through other communication means.

Communicating 322 the subtask progress information to the controllers as appropriate to the subtasks may include communicating information only when it would be useful to a particular controller. In some embodiments, the progress information is communicated only to those controllers for which the information would be useful. This may reduce network traffic.

Identifying 222 subtasks, identifying 226 controllers, generating 230 commands, and communicating 234 the commands can be performed one time for each coordinator activation. Communicated 234 commands can include start times. Therefore, subtasks that need to occur in the future can be requested in advance. Alternatively, as indicated by the dashed line in FIG. 2, identifying 222 subtasks, identifying 226 controllers, generating 230 commands, communicating 234 the commands and, where included, monitoring 238 (e.g., 314, 318), can occur on a repeated, iterative, or on-going basis as the task or workpiece sequentially requires the services of a new or next system portion (e.g., 140-148). In a further alternative, the identifying 222, 226 and generating 230 commands may occur at an initial phase and the communicating 234 of the commands may occur as the task or workpiece requires the services of the new or next system portion. Furthermore, generated 230 commands may be revised or replaced as needed.

Figure 4:
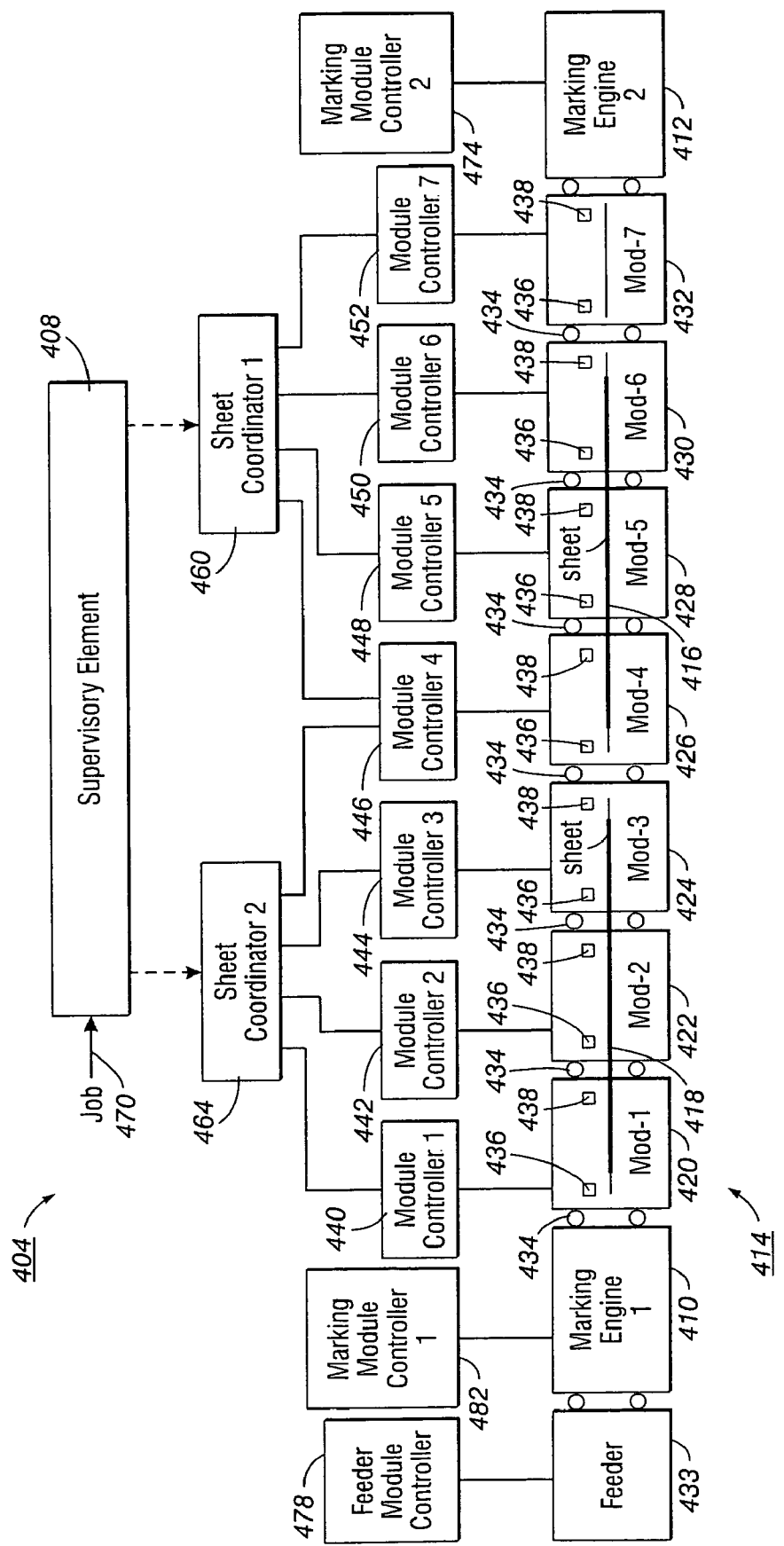
FIG. 4 is a block diagram of a document processing system wherein a supervisory element has activated, spawned or instantiated a plurality of respective coordinators that are responsible for orchestrating respective document processing tasks.

Referring to FIG. 4, an embodiment of a document processing system 404 includes a supervisory element 408, a first marking engine 410, a second marking engine 412 and a transportation system 414.

For example, the first and second marking engines 410, 412 may be xerographic marking engines. Alternatively, one or more marking engines of an embodiment may be of other technologies, such as, but not limited to, ink jet marking technology.

The transportation system 414 transports print media such as a first sheet 416 and a second sheet 418 between the first marking engine 410 and the second marking engine 412. In the illustrated system 404, the transportation system includes a plurality of transport modules. For instance, the plurality of transport modules includes a first, second, third, fourth, fifth, sixth and seventh transport module 420, 422, 424, 426, 428, 430, 432. The system 404 may include additional modules. For example, the additional modules may include a media or paper feeder 433, which delivers sheets of print media or paper to one or both of the marking engines 410, 412. Additional modules (not shown) may transport print media from either or both marking engines 410, 412 to other devices, including, but not limited to, additional marking engines and/or output devices such as paper trays, stackers, collators, staplers and other binders. Furthermore, the plurality of transport modules may form paths that branch off from the illustrated path (420, 422, 418, 424, 426, 430, 432) to transport sheets to other marking engines (not shown) or other devices.

In the illustrated document processing system 404, each transport module 420-432 includes transport actuators. For example, the transport modules 420-432 include motor driven nips 434 for driving or urging print media through the transport system 414. Additionally, or alternatively, the modules 420-432 may include flippers or gates for redirecting print media toward other portions (not shown) of the transportation system 414. Furthermore, the modules may include other kinds of transport actuators. For instance, air jets and/or spherical nips may be included in the transport modules (e.g., 420-432). For the purposes of illustration, the modules of FIG. 4 are associated with the nips 434 depicted to their left. The transport modules 420-432 of the document processor system 404 include sensors. For instance, the sensors may be sheet presence or position sensors. As illustrated, each module 420-432 includes a left side sensor 436 and a right side sensor 438.

Each transport module 420-432 also includes or is associated with a respective module controller 440, 442, 444, 446, 448, 450, 452. For example, the module controllers 440-452 control the actions of the transport actuators of their respective modules 420-432 and receive and relay information from their respective sensors 436, 438.

The supervisory element 408 is operative to generate (e.g., 214) sheet processing task descriptions or itineraries describing respective sheet processing tasks, to activate (e.g., 218) respective sheet coordinators (e.g., a first sheet coordinator 460 and a second sheet coordinator 464) and to communicate the respective sheet processing task descriptions to the respective sheet coordinators (e.g., 460, 464). For example, the supervisory element 408 receives a job description 470. The job description 470 may include descriptions of sheets or pages. The descriptions may include images, or references to images stored elsewhere and indications as to an order in which the images are to appear on sheets of print media. For example, the job description 470 includes page description language describing text and fonts and graphic items as well as their location on particular pages of a document. The supervisory element 408 activates, instantiates or spawns (e.g., 218) a sheet coordinator for each sheet or page (a sheet may have two sides and may, therefore, comprise two pages). The supervisory element 408 analyses the job description 470 and may schedule or plan operations to create the document described in the job description 470. In so doing, the supervisory element 408 generates respective sheet processing task descriptions or itineraries for the transportation and processing of sheets between system resources.

For instance, regarding the transportation of a sheet between system resources, an example itinerary or sheet processing task description may have the following form:

```
Itin 1 1 11
feeder1 feed 19.544
me1 print image27 20.201
m1 left2right 23.341
m2 left2right 23.495
m3 left2right 23.625
m4 left2right 23.755
m5 left2right 23.885
m6 left2right 24.015
m7 left2right 24.145
me2 print image28 24.275
finisher1 stack 27.415
```

The first line is, for example, an itinerary or sheet processing task description identifier. The rest of the itinerary specifies, for example, that a component named feeder1 (e.g., 433) should feed a sheet at time 19.544, then a component named me1 should execute a print action on an image named image27 at a later time, then a component named m1 should execute an action (move the sheet left to right) at a later time, and so on.

The respective sheet coordinators (e.g., 460, 464) are operative to receive the respective sheet processing task descriptions or itineraries and, based on those respective descriptions, identify (e.g., 222) a plurality of respective sheet processing subtasks to be performed in order to complete the respective sheet processing tasks, identify (e.g., 226) respective controllers for controlling respective process actuators to perform the respective sheet processing subtasks, generate (e.g., 230) respective commands for performing the respective sheet processing subtasks and communicating (e.g., 234) the respective commands to the respective module controllers as appropriate to the respective subtasks. Additionally, the respective sheet coordinators (e.g., 460, 464) may identify (e.g., 314) respective information sources that are able to provide progress information regarding the performance of the respective subtasks, collect (e.g., 318) the respective progress information from the respective subsets of information sources and communicate (e.g., 322) the respective progress information to the respective module controllers as appropriate to the respective sheet processing subtasks.

For example, the information sources may include the sensors 436, 438. Additionally, or alternatively, the module controllers themselves may maintain models or estimators of the progress of respective subtasks. Such models are referred to as sheet observer models. In this regard, the module controllers or the estimates or models of the module controllers may be considered information sources.

For instance, in the illustrated document processing embodiment 404, subtasks for a first sheet may have included matching a speed of nips 434 of the first module 420 to a speed of a sheet exiting the first marking engine 410 and receiving the first sheet 416 therefrom. A second subtask might have been for nips 434 of the second module 422 to match the speed of the first sheet 416 as it exited the first module 420. A subtask of the third module 424 may have been to match the speed of the first sheet 416 as a leading edge thereof exited the second module 422. Yet another subtask may have been for the nips 434 of the first, second and third modules 420, 422, 424 to accelerate or to begin to accelerate the first sheet 416 to a higher transportation system 414 transport speed.

Additional subtasks associated with the fourth, fifth and sixth modules 426, 428, 430 may have included matching associated nip 434 speeds to the speed of the first sheet 416 as it entered each module 426, 428, 430 and/or continuing to accelerate the sheet 416.

The transfer or movement of a sheet from module to module must be done in a coordinated manner. In the document processing embodiment 404, the modules 410, 412, 420-433 are tightly coupled by their relationship to a sheet. For example, at any given point in time, a plurality of modules may be in contact with the same sheet. If the nips 434 of modules contacting a sheet are driven at different speeds or with different rates of acceleration or deceleration, the sheet (e.g., 416, 418) may be damaged or distorted in a manner that causes a jam in the transportation system 414 or system 404 as a whole. The sheet coordinators (e.g., 460, 464) ensure cooperative or coordinated actuation of the actuators or modules (e.g., 410, 412, 420-433). For example, at the instant depicted in FIG. 4, the first sheet 416 is in contact with portions of the fourth, fifth and sixth modules 426, 428, 430. The first sheet coordinator 460 is shown in communication with the fourth, fifth, sixth and seventh module controllers 446-452. For example, the first sheet coordinator 460 may be sending commands to the fifth and sixth module controllers 448, 450 that result in the fifth and sixth modules 428, 430 driving the first sheet 416 in a cooperative manner. For instance, the fifth and sixth module controllers 448, 450 may be directed to begin decelerating the first sheet 416. Additionally, the first sheet coordinator 460 may be requesting or receiving sensor information or sheet observer model information from the fourth module controller 446. For instance, the first sheet coordinator 460 may be requesting to be notified when a trailing edge of the first sheet 416 passes the left sensor 436 of the fourth module. Additionally, the first sheet coordinator 460 may be asking or receiving sensor information from the sixth module 430. For instance, the first sheet coordinator 460 may be requesting to be notified when a leading edge of the first sheet 416 passes or enters a field of view of the right sensor 438 of the sixth module.

This sensor information may be relayed by the sheet coordinator to the seventh module controller 452. Additionally, or alternatively, the first sheet coordinator 460 may update a model, such as a world observer model of the task or of the subtasks based on the information from the information sources or sensors (e.g., 436, 438).

In addition to possibly relaying sensor information, the first sheet coordinator 460 may be sending commands directing the seventh module controller 452 to prepare the seventh module 432 to receive the first sheet 416. For instance, the seventh module controller 452 may be directed to drive nips 434 of the seventh module 432 at a speed compatible with the speed of the first sheet 416 as the leading edge thereof exits the sixth module 430. Additionally, the fifth, sixth and seventh module controllers 448, 450, 452 may be receiving commands directing that they begin decelerating the first sheet in preparation for its entry into the second marking engine 412. The first sheet coordinator 460 may also be transmitting commands to the fourth module controller 446 releasing it from service or subtasks related to the transportation of the first sheet 416. Alternatively, prior commands may have included an expiration event, such as a time limit or sensor reading, the occurrence of which automatically deactivates or releases the fourth module controller from services related to the first sheet 416.

At a point later in time than the instant depicted in FIG. 4, the first sheet 416 may enter the second marking engine 412 for processing. For example, the second marking engine may be used to print an image on a second side of the first sheet or may apply color markings that the first marking engine 410 did not apply. At that later point in time, the first sheet will no longer be in contact with the fourth module 426 and the trailing edge of the first sheet will be about to exit the fifth module 428. The fourth module controller 446 may have already been released (as described above) from subtasks associated with processing the first sheet 416 and may have begun performing subtasks associated with processing the second sheet 418. The fifth module controller 448 may be about to be similarly released.

The sixth and seventh transport modules 430, 432 and the second marking engine (or module) 412 are likely all in contact with the first sheet 416. Therefore, the first coordinator 460 is generating or has generated (e.g., 230) and will communicate or has communicated (e.g., 234) commands for the sixth and seventh transport modules 430, 432 and the second marking engine 412 or a marking engine module controller 474. The commands may be cooperative in nature. For example, the transport modules 430, 432 may be directed to slow the sheet to a speed compatible with capabilities of the marking engine 412. Additionally, commands for the second marking engine controller 474 may direct it to control the second marking engine 412 to accept the first sheet at the compatible speed and to place specified marks on portions of the first sheet 416. As the first sheet 416 continues into the second marking engine 412, the sixth and seventh module controllers 450, 452 will be released from subtasks associated with the first sheet 416, or deactivated. Eventually, the first sheet 416 will exit the second marking engine or module 412 and be delivered to other modules (e.g., transport modules, finishers, stackers and/or other print engines). The first coordinator will continue to send appropriate commands to the subsequent modules, relay progress information and release or deactivate controllers, in the sequential manner described above, until the task described in the task description, or itinerary, received when the first coordinator 460 was activated 218 is completed. When the task is completed, the first coordinator 460 may be deactivated.

Similar processing occurs with regard to the second 464 and subsequent (not shown) coordinators and second 418 and subsequent (not shown) sheets. For example, as depicted in FIG. 4, the second sheet 418 is within the first, second and third modules 420, 422, 424. The second sheet coordinator 464 is depicted as in communication with the first, second, third and fourth module controllers 440-446. For example, the second sheet coordinator 464 may be directing the second and third module controllers 442, 444 to drive the second sheet 418 at the same speed and/or with the same acceleration, receiving or requesting sensor information from the sensors 436, 438 of the first module 420 and/or the third module 424, releasing the first module controller 440 from tasks associated with transporting the second sheet 418, and/or directing the fourth module controller 446 to prepare to receive the second sheet 418 by driving nips 434 of the fourth module 426 at a speed appropriate to, or compatible with, a speed of the second sheet 418, as a leading edge thereof exits the third module 424 and enters the fourth module 426. As the sheets 416, 418 are transported through the system 404, the sheet coordinators deactivate or release module controllers no longer processing their respective sheets and send commands to downstream controllers preparing them to receive their respective sheets.

Prior to the moment depicted in FIG. 4, the first coordinator generated 230 and sent 234 commands to a feeder module controller 478 directing it to control the feeder 433 to deliver the first sheet 416 to the first marking engine (or transport modules on a path thereto (not shown)) and may have generated 230 and sent 234 commands to a first marking module controller 482 instructing it to control the first marking engine 410 to place particular marks on portions of the first sheet 416 and deliver the first sheet 416 to the first transport module 420. As mentioned above, when their respective tasks, as described in their respective sheet processing task descriptions or itineraries, are completed, the respective sheet coordinators (e.g., 460, 464) are deactivated. For instance, they are de-instantiated or placed in an idle mode to await re-initialization with information from a new sheet processing task description.

Supervisory element and module controller embodiments may be made substantially in software stored in computer storage devices, such as memory elements, and run by computational platforms, such as microprocessors, microcontrollers, and digital signal processors. Alternatively, supervisory elements and module controllers may be embodied in various combinations of hardware and software.

In a prototype, the transport module controllers were each embodied in separate computational platforms associated with transport modules on a one-to-one basis. Each transport module included a plurality of nips and flippers. Marking engines are known to include their own controllers. The supervisory element 408 was run on one computational platform and activated or spawned sheet coordinators (e.g., 460, 464) were software elements run on another computational platform. However, embodiments wherein the sheet coordinators, or activating data associated with the sheet coordinators, move from module controller to module controller (e.g., 440-452, 474-482) as their respective sheets move from module to module (e.g., 433, 410, 420-432, 412), are contemplated.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for coordinating controllers in a distributed control system that is operative to perform a plurality of simultaneous tasks, the method comprising:
   determining, by a supervisory element, respective tasks of the plurality of simultaneous tasks to be performed;
   activating, by the supervisory element, respective coordinators in association with the respective tasks, the respective coordinators comprising software elements run on or by at least one computational platform, the respective coordinators then each:
   identifying a plurality of respective subtasks to be performed in order to complete the respective tasks;
   identifying, based on the identified respective subtasks, a plurality of respective controllers, for controlling a plurality of actuators to perform the respective subtasks;
   generating respective commands for directing the performance of the respective plurality of subtasks;
   communicating the respective commands to the respective controllers as appropriate to the respective subtasks;
   collecting respective progress information from at least one respective information source; and
   communicating the respective progress information to the respective controllers as appropriate to the respective subtasks.

2. The method of claim 1 further comprising:
   deactivating, by at least one of the respective coordinators, respective controllers as respective subtasks are determined to be completed based on the collected respective progress information, thereby releasing the respective controllers to execute commands communicated from another coordinator associated with another task.

3. The method of claim 1 further comprising:
   deactivating at least one respective coordinator when the respective task of the at least one coordinator is determined to be completed.

4. The method of claim 1 further comprising:
   maintaining at least one model of the respective subtasks; and
   deactivating at least one of the coordinator and the respective controllers when the respective subtasks are completed according to the at least one model.

5. The method of claim 1 further comprising:
   Identifying by at least one of the respective coordinators, at least one respective information source that is able to provide progress information regarding a performance of the respective subtasks.

6. The method of claim 5 wherein identifying at least one respective information source comprises:
   at least one of identifying at least one feedback variable from at least one controller and identifying at least one sensor.

7. The method of claim 1 further comprising:
   maintaining at least one of a command model of the respective task based on the communicated respective commands and a progress model of the respective task based on the collected respective progress information.

8. The method of claim 1 further comprising:
maintaining a command model of the respective task based on the communicated respective commands;
maintaining a progress model of the respective task based on the collected respective progress information;
comparing a first indicated status of the respective task from the progress model to a second indicated status from the command model, thereby generating a respective task progress error value; and
comparing the respective task progress error value to a respective task progress error limit; and
performing an error task if the respective task progress error value is beyond the respective task progress error limit.

9. The method of claim 8 wherein performing the respective error task comprises:
generating at least one of a respective error message identifying the respective task and describing the respective task progress error and at least one updated command message for correcting or compensating for a respective task progress error associated with the respective task progress error value.

10. A system comprising:
at least one supervisory element, run by a computational platform, that is operative to generate respective task descriptions describing respective tasks, to activate respective coordinators to be responsible for orchestrating a completion of the respective tasks and to communicate the respective task descriptions to the respective coordinators;
a plurality of controllers that are operative to control a plurality of actuators according to respective subtask descriptions received from the respective coordinators; and
a plurality of information sources that are operative to report status information regarding respective progress of respective tasks to the respective coordinators;
wherein the respective coordinators are operative to receive the respective task descriptions, identify, based on the respective task descriptions, a plurality of respective subtasks to be performed in order to complete the task, identify, based on the respective subtasks, a subset of the plurality of respective controllers, for controlling a subset of the plurality of actuators to perform the respective subtasks, generate respective commands for performing the respective plurality of subtasks, communicate the respective commands to the respective controllers as appropriate to the respective subtasks, collect the respective progress information from the respective subsets of information sources and communicate the respective progress information to the respective controllers as appropriate to the respective subtasks.

11. The system of claim 10 wherein the respective coordinators are further operative to monitor the respective progress of the respective subtasks.

12. The system of claim 11 wherein the respective coordinators are further operative to deactivate the respective controllers as the subtasks are completed.

13. The system of claim 10 wherein the respective coordinators are further operative to report the respective progress of the respective tasks to the supervisor and wherein the supervisor is further operative to deactivate the respective coordinators when the respective tasks are completed.

14. The system of claim 10 wherein the at least one supervisory element is operative to activate the respective coordinators by spawning or instantiating the respective coordinators.

15. The system of claim 10 wherein the supervisor is operative to activate the respective coordinators by communicating respective task descriptions to respective idle coordinators.

16. The system of claim 10 wherein the plurality of controllers comprises:
at least one of a transport actuator controller, a nip controller, a feeder controller, finisher controller and a marking engine controller.

17. The system of claim 10 wherein the plurality of actuators comprises:
at least one of a xerographic marking engine actuator, a transport actuator, a nip driver, a feeder actuator and a finisher actuator.

18. The system of claim 10 wherein the respective coordinators are operative to identify respective subsets of the plurality of information sources that are able to provide progress information regarding the performance of the respective subtasks by at least one of identifying at least one sensor and identifying at least one feedback variable from at least one controller of the plurality of controllers.

19. The system of claim 11 wherein the respective coordinators are operative to monitor the respective progress of the respective subtasks by at least one of maintaining a command model of the task based on the communicated respective commands and maintaining a progress model of the task based on the respective progress information.

20. The system of claim 11 wherein the respective coordinators are operative to monitor the respective progress of the respective subtasks by maintaining respective models of the respective tasks based on the communicated respective commands and maintaining respective progress models of the respective tasks based on the respective progress information and wherein the respective coordinators are further operative to compare respective first indicated statuses of the respective tasks from the progress model to respective second indicated statuses of the respective tasks from the command based model, thereby generating respective task progress error values, to compare the respective task progress error values to respective task progress error limits and to perform respective error tasks if the respective task progress error values are beyond the respective error limits.

21. A method for processing a sheet in a document processing system, the method comprising:
receiving at a supervisory element, a sheet description specifying a document processing job to be performed on the sheet;
activating by the supervisory element, a coordinator as a proxy for the sheet, the coordinator then:
identifying a plurality of respective subtasks to be performed in order to process the sheet according to the sheet description;
identifying, based on the identified respective subtasks, a plurality of respective controllers for controlling a plurality of actuators to perform the respective subtasks;
generating respective commands for directing the respective plurality of subtasks;
communicating the respective commands to the respective controllers as appropriate to the respective subtasks;
collecting respective progress information from at least one respective information source;
communicating the respective progress information to the respective controllers as appropriate to the respective subtasks;
estimating the respective progress of the respective subtasks;

deactivating the respective controllers as the subtasks are completed; and deactivating by the supervisory element, the coordinator when the task is completed.

22. A document processing system comprising:
a first xerographic marking engine;
a transportation system that is operative to transport sheets of print media to and/or from the first engine, the transportation system including a plurality of transport actuators,
at least one supervisory element that is operative to generate respective sheet processing task descriptions describing respective sheet processing tasks and to activate respective sheet coordinators to be responsible for orchestrating the respective sheet processing tasks according to the respective sheet processing task descriptions;
a plurality of respective transport controllers that are operative to control respective sets of transport actuators, of the plurality of transport actuators, according to respective sheet processing subtask descriptions received from the respective sheet coordinators;
a first marking module controller that is operative to control aspects of processing of the first marking engine according to respective sheet processing subtask descriptions received from the respective sheet coordinators, and
a plurality of information sources that are operative to report status information regarding respective progress of respective sheet processing tasks to the respective sheet coordinators;
wherein the respective sheet coordinators are operative to receive the respective sheet processing task descriptions, identify, based on the respective sheet processing task descriptions, a plurality of respective sheet processing subtasks to be performed in order to complete the respective sheet processing tasks, identify, based on the respective sheet processing subtasks, a subset of the plurality of respective transport controllers and the first marking module controller, for controlling a subset of the plurality of transport actuators and the first marking engine to perform the respective sheet processing subtasks, identify respective subsets of the plurality of information sources that are able to provide progress information regarding the performance of the respective sheet processing subtasks, generate respective commands for performing the respective plurality of sheet processing subtasks, communicate the respective commands to the respective transport controllers and/or first marking engine controller as appropriate to the respective subtasks, collect the respective progress information from the respective subsets of information sources and communicate the respective progress information to the respective transportation controllers and/or first marking engine controller as appropriate to the respective sheet processing subtasks.

23. The document processing system of claim 22 wherein the plurality of transport controllers comprises:
at least one of a nip controller, an air jet controller, a flipper controller and a spherical nip controller.

24. The document processing system of claim 22 further comprising:
at least a second marking engine;
at least a second marking module controller that is operative to control aspects of processing of the at least a second marking engine according to respective sheet processing subtask descriptions received from the respective sheet coordinators,
wherein the transportation system is further operative to transport sheets of print media to and/or from the at least a second marking engine; and
wherein the respective sheet coordinators are further operative to identify, based on the respective sheet processing subtasks, at least a respective one of the at least a second marking module controller, for controlling at least a respective one of the at least a second marking engine to perform the respective sheet processing subtasks, and communicate the respective commands to at least a respective one of the at least a second marking module controller as appropriate to the respective subtasks.

25. A method for coordinating controllers in a distributed control system that is operative to simultaneously perform operations on a plurality of workpieces, the method comprising:
activating, by a supervisory element, a respective coordinator for each respective workpiece, wherein each respective coordinator encompasses knowledge regarding an itinerary of operations to be applied to the respective workpiece, each respective coordinator thereby:
issuing respective commands to a series of actuator controllers for directing the series of actuators to perform respective operations on the respective workpiece according to the itinerary;
maintaining at least one respective estimate of progress of the respective operations performed on the respective workpiece; and
deactivating the respective coordinator when the itinerary of operations is completed.

* * * * *

UNITED STATES PATENT AND TRADEMARK OFFICE
CERTIFICATE OF CORRECTION

| | |
|---|---|
| PATENT NO. | : 7,873,962 B2 |
| APPLICATION NO. | : 11/102910 |
| DATED | : January 18, 2011 |
| INVENTOR(S) | : Lara S. Crawford et al. |

It is certified that error appears in the above-identified patent and that said Letters Patent is hereby corrected as shown below:

Title Page; Item (73) Assignee: Should read

-- (73) Assignee: Palo Alto Research Center Incorporated
　　　　　　　　　Palo Alto, CA (US) --.

Signed and Sealed this
Eighth Day of March, 2011

David J. Kappos
*Director of the United States Patent and Trademark Office*